(12) United States Patent
Distel et al.

(10) Patent No.: US 7,748,771 B2
(45) Date of Patent: Jul. 6, 2010

(54) APPARATUS TO IMPROVE THE AERODYNAMICS, FUEL ECONOMY, DOCKING AND HANDLING OF HEAVY TRUCKS

(76) Inventors: Richard Henry Distel, c/o Distel Tool & Machine Company, 12800 E. Ten Mile Rd., Warren, MI (US) 48089; Richard Albert Distel, c/o Distel Tool & Machine Company, 12800 E. Ten Mile Rd., Warren, MI (US) 48089

( * ) Notice: Subject to any disclaimer, the term of this patent is extended or adjusted under 35 U.S.C. 154(b) by 486 days.

(21) Appl. No.: 11/888,241

(22) Filed: Jul. 31, 2007

(65) Prior Publication Data
US 2009/0295189 A1 Dec. 3, 2009

(51) Int. Cl.
*B62D 35/00* (2006.01)
(52) U.S. Cl. .................................... 296/180.4
(58) Field of Classification Search .............. 296/180.1, 296/180.2, 180.4
See application file for complete search history.

(56) References Cited

U.S. PATENT DOCUMENTS

| | | | | |
|---|---|---|---|---|
| 5,280,990 A | * | 1/1994 | Rinard | 296/180.1 |
| 5,498,059 A | * | 3/1996 | Switlik | 296/180.1 |
| 5,863,090 A | * | 1/1999 | Englar | 296/180.1 |
| 6,257,654 B1 | * | 7/2001 | Boivin et al. | 296/180.5 |
| 6,485,087 B1 | * | 11/2002 | Roberge et al. | 296/180.5 |
| 6,854,788 B1 | * | 2/2005 | Graham | 296/180.4 |
| 7,008,005 B1 | * | 3/2006 | Graham | 296/180.4 |
| 7,192,077 B1 | * | 3/2007 | Hilleman | 296/180.1 |
| 7,604,284 B2 | * | 10/2009 | Reiman et al. | 296/180.4 |
| 2002/0030384 A1 | * | 3/2002 | Basford | 296/180.1 |
| 2007/0024087 A1 | * | 2/2007 | Skopic | 296/180.4 |
| 2007/0089531 A1 | * | 4/2007 | Wood | 73/861.22 |

FOREIGN PATENT DOCUMENTS

DE 2218300 * 4/1980 ............ 296/180.1

* cited by examiner

*Primary Examiner*—Joseph D Pape

(57) ABSTRACT

A device to alter and/or reduce the aerodynamic, base drag on and improve the stability of a bluff bodied vehicle, such as a heavy trailer with or without two aft vertically hinged doors, comprised of preformed, resilient, semi-circular airfoils permanently attached with hinges to the aft planar surface or the rear doors of the vehicle, at the vertical left and right corner edges, the horizontal top corner edge, the horizontal bottom corner edge of the vehicle, or at two or more of these positions. The airfoils self stow when the doors are opened and resume their initial shape when the doors are closed. If accidentally impacted, the airfoils deflect and then resume their initial shape. The airfoils can be fitted with compact air nozzles to blow air tangentially over their outer surfaces to enhance their effect. The device is inexpensive, lightweight and easily installed, replaced and retrofitted.

6 Claims, 9 Drawing Sheets

APPARATUS TO IMPROVE THE AERODYNAMICS, FUEL ECONOMY, DOCKING AND HANDLING OF HEAVY TRUCKS

CROSS REFERENCE TO RELATED APPLICATIONS

This application does not claim the benefit of any prior filed non-provisional applications.

GOVERNMENT INTERESTS

The invention described herein was developed solely by the applicants with no financial or other assistance from the United States government.

REFERENCE TO COMPACT DISC APPENDIX

Not applicable.

BACKGROUND

1. Area of Invention

The invention is a device, capable of self-stowing, to improve the aerodynamics and/or reduce base drag at the aft end of bluff bodies, such as box shaped heavy trailers towed by powered tractor trucks and similarly shaped cargo and passenger vehicles, that does not impede trailer docking and is capable of incorporating air blowing techniques.

2. Essential Perameters

The purpose of the invention is to improve of the aerodynamics at the aft end of a heavy trailer or other vehicle having a bluff body to reduce aerodynamic drag. The reduction of drag lessens the energy required from, and therefore the fuel consumption, of the powered vehicle or towing vehicle. A device producing this effect is economically beneficial to the operator and will lessen national fuel consumption and emissions.

The design of the vast majority of existing and newly constructed heavy trailers incorporates a pair of outwardly hinged doors that cover the entire aft end of the trailer and are capable of swinging through an arc of 270 degrees from the closed position to a position parallel to the outside of the sides of the trailer. This feature is essential to efficient loading and docking but presents a major obstacle to the application of aft end aerodynamic devices.

Aerodynamic devices that need to be removed or partially disassembled to enable door function are cumbersome, costly, subject to loss and can be accidentally dislodged; they require temporary storage and entail lost time and added effort to the operator, to the economic disadvantage of the freight carrier.

Because heavy trailers frequently wait in the yard between transits, and because the cost of fuel saved by the device is a finite number, there exists an economic threshold to the cost to manufacture and install the device, precluding complex devices with multiple components.

To become widely accepted by the trucking industry an aft end aerodynamic device must be functional, low in cost, easily retrofitted, permanently attached, allow normal door function, and require little or no operator intervention in its use.

3. Technical Considerations

Extensive studies have been performed to demonstrate and evaluate the efficacy in drag reduction of various aerodynamic alterations to and of aerodynamic devices for the traditional, rectangular box shape of the heavy trailer and other similarly shaped highway vehicles. Herein, only those modifications relating to the trailing or aft end of the heavy trailer will be addressed.

In an SAE (Society of Automotive Engineers) technical paper presented in May 2001 [Advanced Aerodynamic Devices to Improve the Performance, Economics, Handling and Safety of Heavy Vehicles; 2001-01-2072], the author, Robert J, Englar, Principal Research Engineer, Georgia Tech Research Institute, summarizes the results of research conducted for the DOE Office of Heavy Vehicle Technologies. Computer and wind tunnel tests indicated that applying a fixed curved surface to the aft edges of the trailer produced a 7.3% reduction in drag.

Furthermore, by blowing compressed air tangentially over that surface, the reduction of aerodynamic drag can be significantly enhanced as the blown air entrains air passing along the sides of the vehicle (the so called Coanda Effect); and when the blowing is selectively applied, stability of the trailer can be improved.

An AIAA (American Institute of Aeronautics and Astronautics) paper presented in July, 2004 [DOE's Effort to Reduce Truck Aerodynamic Drag—Joint Experiments and Computations Lead to Smart Design; UCRL-CONF-204819], summarizes the results of further DOE sponsored testing of various devices and recites positive drag reduction results of 10-12% from corner rounding and an additional 15% from tangential blowing.

According to a July 2001 article in Trailer-body Builder Magazine [Winds of Change; http://trailer-bodybuilders.com/mag], in which Robert J. Englar was interviewed, The American Trucking Associations determined that each 3% reduction in a vehicle's drag coefficient equates to about 1% in fuel savings. Englar is said to have described the device to be used in testing as "90 degree arcs", and as "a patented curved surface 6-9" in radius attached . . . to the four corners of the back end of the trailer" (quotes from the article, not directly from Englar).

A Georgia Tech Research News release [Jan. 2, 2005, Low-Drag Trucks: Aerodynamic Improvements & Flow Control System Boost Fuel Efficiency in Heavy Trucks; http://gtresearchnews.gatech.edu/newsrelease/truck fuel.htm] further describes the road test devices and their application to vehicle stability as well as drag reduction.

The engineering and aerodynamic principles involved in the creation of the cited drag reductions and contributions to trailer stability are fully described in the afore-mentioned engineering papers and need not be recited herein.

U.S. Pat. Nos. 5,863,090 and 7,192,077 to Englar pertain to racing cars and ground vehicles, respectively, and disclose the theory, application and methods of generation, expulsion and control of air blown over surfaces of a vehicle to create the Coanda Effect with resultant effects on aerodynamic drag and vehicle stability. Devices to enable the production of these effects at the aft of a heavy trailer or other vehicle having a box like shape and bluff aft end is the subject of the invention.

The actual rounding of the corners of the trailer is impractical due to considerations of cargo space, loading and the sealing of the rear doors. In light of the above, a need exists for a device to be attached to the aft of the trailer to accomplish the same effect as corner rounding while meeting the essential parameters outlined in [0002-0006] above. The device is to be capable of manufacture in a shape to suit optimal aerodynamic requirements, and to be easily adapted for tangential blowing. [See DOE 21$^{st}$ Century Truck Partnership White Paper, 21CTP-003, pg. 38].

4. Prior Art

Numerous aerodynamic devices have been patented that are designed to attach to the rear of the trailer. Because of the narrow scope of the invention, only prior art pertaining to permanently attached devices that simulate the rounding of the corners of the aft end of the trailer, that relate to the blowing of air at the corners or relate to a self-stowing or non-removable concept or system for aft-of-trailer will be considered.

While the means and method of blowing air tangentially over the device of this invention is a part hereof, neither the inventions, per se, of the tangential blowing of air to reduce aerodynamic drag, nor a control system for this purpose, nor a means to generate air for this purpose are a part on the invention, as these are contained in prior art.

U.S. Pat. No. 6,854,788 to Graham discloses a self-deploying device, which attaches to the rear doors and to the sides of the aft end of the trailer. Flexible flat sheets positioned at the sides of the trailer when the doors are open. As the doors close, the motion of the doors cause the sheets to be forced aft and formed into curved surfaces (airfoils) by means of and with the support of struts acting on them. The device consists of a minimum of 22 individual parts (not counting fasteners).

While these airfoils may serve to reduce aerodynamic drag, they are large and rigid when deployed, making them subject to damage if accidentally contacted. In addition the plurality of parts and interconnections, and multiple fastening points make them costly to manufacture and install. Even if constructed, as suggested, of aluminum, they add considerable weight and the scrap value of this material makes them targets of theft.

U.S. Pat. No. 5,824,734 to Lechner discloses a design for the aft end of a vehicle causes the top and sides of the vehicle to be angled toward the center at a suggested angle of 10 to 20 degrees. It is unclear whether these surfaces are formed into the body of the vehicle or whether the angled surfaces are rigidly attached extensions. In either case this device is not suitable for application to heavy trailers due to door function and loading requirements, and is not retrofittable.

Lechner further claims devices to blow air at an angle at the outer edge of the rear end of the device, invoking the Coanda Effect, but does not define the configuration or placement of the nozzles to be used to achieve this. It is questionable whether this is a proper application of the Coanda effect.

U.S. Pat. No. 7,129,077 to Hilleman discloses hollow, rounded devices attached to the vertical edges of the aft of the trailer. These appear at first to be corner rounding devices but are in fact scoops that gather air at the sides and direct it into the space at the aft of the trailer. Although the devices move forward so as to not project behind the aft end of the trailer, there is no provision to allow the doors to be swung flush to the sides of the trailer.

U.S. Pat. No. 5,280,990 to Rinard discloses a system or combination of individual devices that are to be applied in concert to the Class 8 truck, both to tractor and trailer. The claims include right and left side "arcuate" devices of a deformable, resilient material attached to the aft vertical edges of the trailer to direct air "passing along" the sides of the trailer transversely into the area at the rear of the trailer. These are vanes or deflectors and have no relation to corner rounding.

The devices referred to in [0023] are attached to the trailer by articulated support brackets that allow the devices, through the action of opening the doors, to pivot in such a way as to lie between the sides of the trailer and the outer faces of the doors when the doors have been swung 270 degrees from the closed position.

The attachment devices referred to in [0024] appear to consist of a minimum of 32 components (not counting fasteners). In the deployed orientation, the vanes and brackets extend aft of the end of the trailer making them susceptible to accidental damage from rear or side impact. Due to these features, the self-stowing aspect of the devices is impractical and requires high cost to manufacture, install and maintain.

U.S. Pat. App. Pub. No. US2007/0024087 (Skopic) discloses a pair of symmetrical devices consisting of "flexible vanes" attached by cables or "mesh" vertically at both aft corners of the trailer and intended to redirect air "flowing" along the sides of the vehicle into "a volume of low pressure air" aft of the vehicle. The vanes are formed with 2 angles and three faces and approximate a 90 degree short-sided angle with a flatted point.

The devices described in [0026] are not intended for corner rounding, but as deflectors. Their ability to self-store between the sides of the trailer and the outer faces of the doors, when opened 270 degrees from the closed position, requires the use of the aforementioned cables or extremely flexible mesh. This makes them subject to damage or dislodgement and reduces their real world practicality.

U.S. Pat. No. 6,485,087 to Roberge and Boivin discloses a device for attaching flat, hinged, side extensions to the aft vertical and top corners of the trailer and has no relevance to corner rounding. The attaching features of this device use the expedient of replacement of the existing trailer door hinges. Position when deployed is maintained by one or more cables in conjunction with pressure exerted by top flaps, powered by pneumatic springs.

U.S. Pat. No. 6,257,654 to Boivin, et al. discloses a device for attaching flat, hinged, side extensions to the aft vertical corners of the trailer and has no relevance to corner rounding. The attaching features of this device use the expedient of replacement of the existing trailer door hinges. Position when deployed is maintained through a combination of cables, springs, pneumatic cylinders or the like. A top flap on each door is similarly attached and controlled.

The devices described in [0028] and [0029] extend rigidly straight back from the aft of the trailer making them susceptible to accidental damage from rear or side impact. The plurality of parts increases the cost, weight and difficulty of installation.

The device described in [0029] differs from that described in [0028] in that the side extensions are shortened at their tops to clear the top of door flaps when stowed. The devices of both these inventions are stowed and deployed by the action of swinging the rear doors 270 degrees from and back to the closed position, requiring the aforementioned springs as a power source, and some sort of restraint.

U.S. Pat. App. Pub. No. 2007/0089531 (Wood) discloses a device generally referred to a "boattail plates", and has no relation to corner rounding. The device self stows and deploys by the action of swinging the rear doors 270 degrees from and back to the closed position. A spring hinge, pneumatic cylinder or mechanical brace is employed to hold the device against a stop in its deployed position. Friction occasioned by the trailing edge of the device riding on the outer sidewalls of the trailer during door opening is dealt with through the commonly invoked use of rollers and/or antifriction materials applied to the contact surfaces.

The devices described in [0028, 0029 and 0031] all involve flat, essentially rectangular panels, seeming to be 15 to 20" in length, that extend rigidly straight back from the aft face of the trailer. This makes the devices susceptible to damage from accidental side or rear impact.

U.S. Pat. App. No. 2002/0030384, Basford, employs drag vortex generators in conjunction with boattail plates and claims that the effective length of the boattail plates can thereby be decreased. A length of 12" is described for these plates that are not self-stowing. Even this reduced length does not alleviate the potential for accidental damage.

German Pat. No. DE2218300 discloses design features for corner contours to reduce aerodynamic drag on vehicles. These are intended to be formed on the actual exterior of the vehicle body and do not apply to added devices for heavy trailers.

SUMMARY OF THE INVENTION

The first embodiment of the invention employs preformed, specially shaped airfoils made of a semi-rigid, resilient material, positioned on or near the four outboard, corner edges of the aft face of the vehicle, attached with a plurality of hinges to the aft face of the vehicle, or to the aft faces of the doors of a vehicle having rear doors, utilizing the existing trailer door hinges and/or a plurality of hinges. The unhinged edges of the airfoils rest against and slide on the outer surface of the aft surface of the trailer or of the doors so that in the latter application, when the doors are swung 270 degrees from the closed position, contact between the trailer sides and the apex of the air foils causes the airfoils to flatten and self stow between the fully swung doors and the sides of the trailer. The airfoils are economically manufactured, easily installed and retrofitted and will deflect without damage if accidentally impacted. The purpose of the device is to reduce aerodynamic drag on the vehicle by simulating aft corner rounding of the trailer.

The second embodiment of the invention employs similarly designed airfoils for the same purpose that function in like manner, positioned selectively at fewer than the four edges of the aft of vehicle.

The third embodiment of the invention enhances the aerodynamic effect of the airfoils through the incorporation of specially designed, compact air nozzles that direct compressed air tangentially along the outer curvature of the airfoils to influence their drag reducing effect and/or contribute to vehicle stability. While reference is made to a heavy trailer, the invention can be applied to any box shaped vehicle having a bluff aft.

Figure 1:
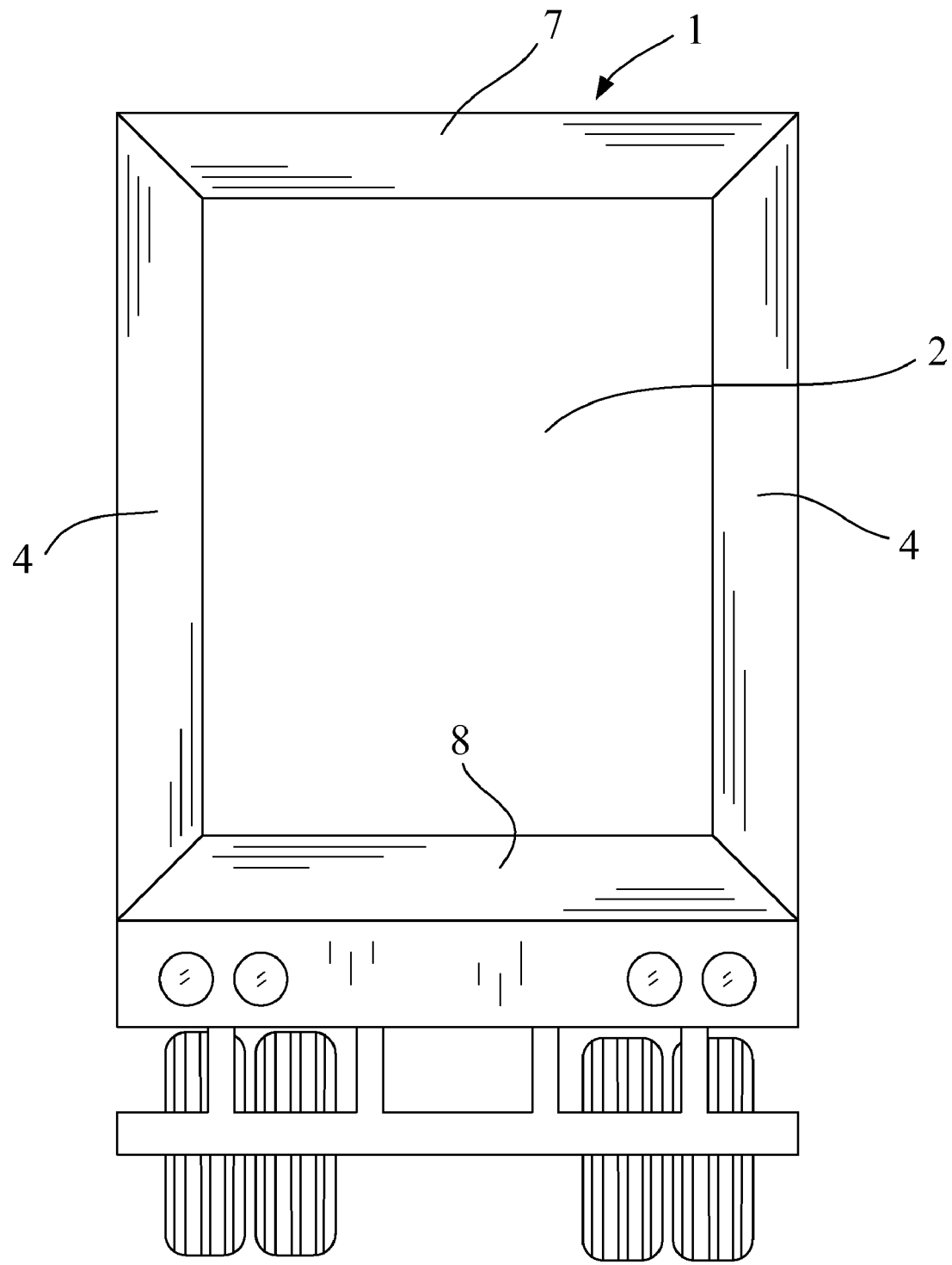
FIG. 1: A view of the aft end of the vehicle. A heavy trailer is shown having no rear doors. The first embodiment of the invention is shown, attached with hinges at the four outboard corner edges of the aft faces of the vehicle.

For clarity, small fasteners such as screws, nuts, rivets, adhesives and the like are generally not enumerated in the drawings. These are commercially available and conventionally applied.

DETAILED DESCRIPTION OF THE INVENTION

Figure 2:
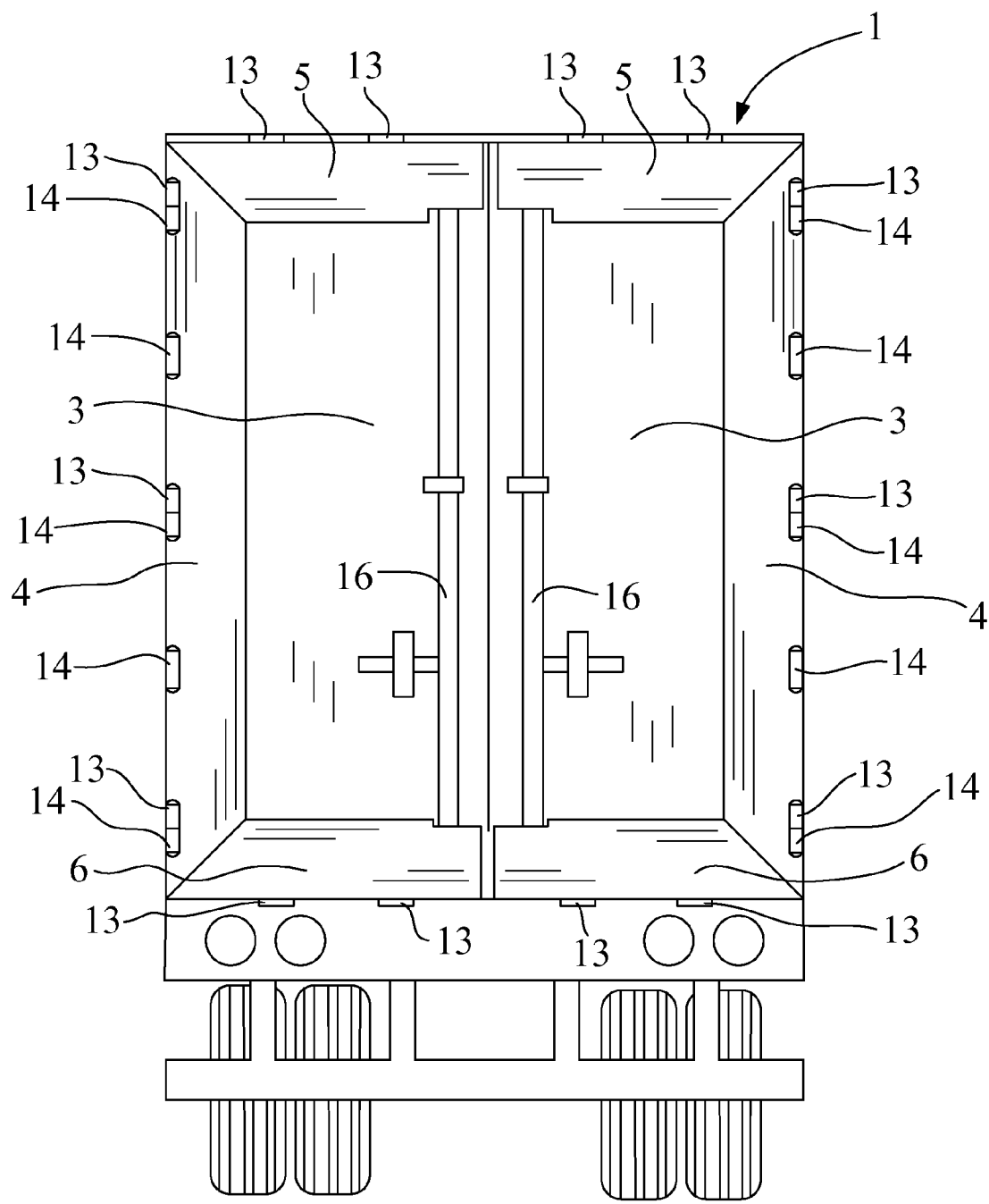
FIG. 2: A view of the aft end of the vehicle. A heavy trailer is shown having two, hinged rear doors. The first embodiment of the invention is shown, attached to or with hinges at the four outboard corner edges of the aft faces of the doors.
Figure 3:
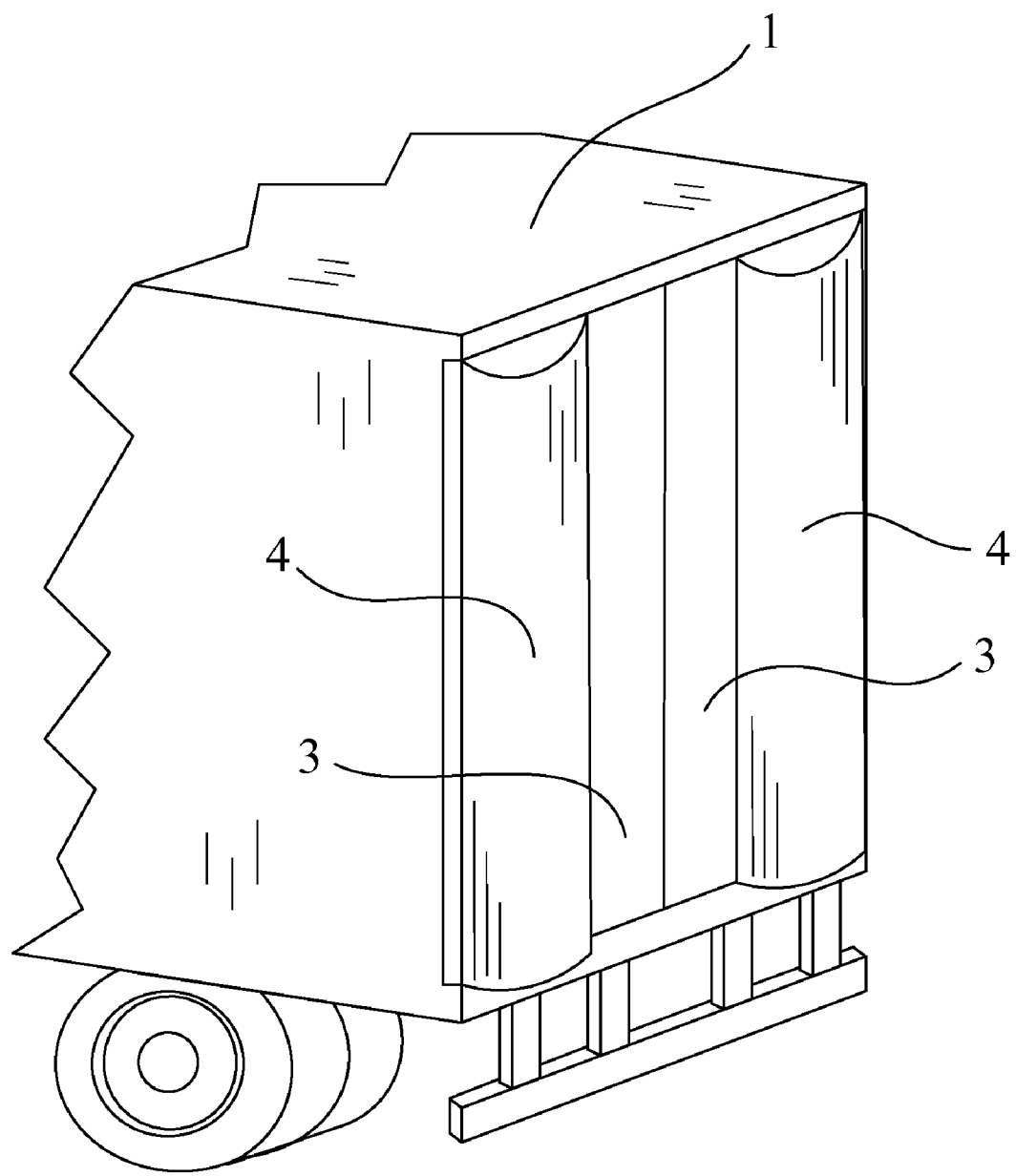
FIG. 3: An isometric view of the aft end of a vehicle having two rear doors. A second embodiment of the invention is shown illustrating the device attached only to the left and right side corner edges of the aft face of vehicle.
Figure 4:
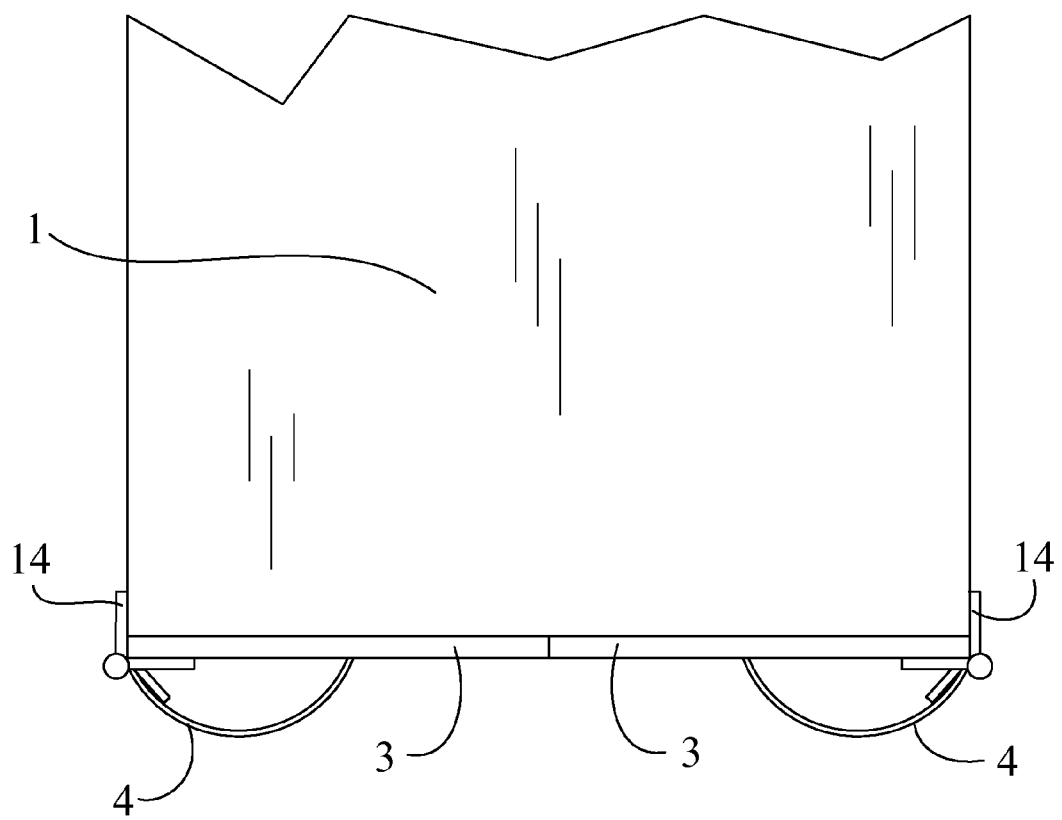
FIG. 4: A bird's eye view of the aft end of the vehicle. A heavy trailer is shown having two rear doors in the closed position. A second embodiment of the invention is shown as in FIG. 3. The devices are shown in their configuration as true semi-circles.

The general principle of the first and second embodiments of the invention is that by creating rounded surfaces at the aft right, left, top, and bottom corners edges (or a combination thereof) of a vehicle having a box like structure with a bluff aft, as shown in FIGS. 1, 2 and 3, the aerodynamic characteristics of the vehicle can be changed so as to reduce base drag with resultant reduction in fuel consumption. The application described is to heavy trailers, but the invention can be applied to any box shaped vehicle having a bluff aft.

Figure 11:
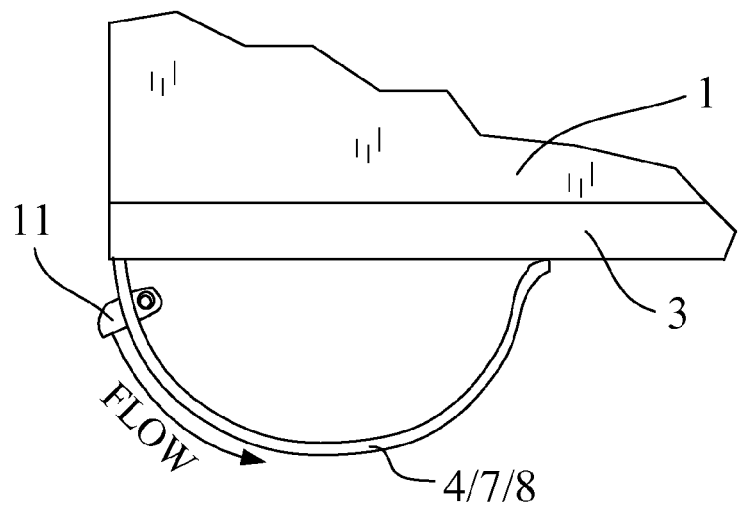
FIG. 11: A bird's eye detail view of the left side of the aft end of the vehicle as shown in FIG. 4, illustrating the approximate placement and function of the air nozzle shown in FIG. 10.

The general principle of the third embodiment of the invention is to adapt the devices of the first or second embodiments of the invention with air nozzles to blow air tangentially over the rounded surfaces at the aft corners of the vehicle as shown in FIG. 11; thereby enhancing the aerodynamic improvement of the vehicle to produce greater reduction of base drag and fuel consumption, and by the selective blowing of air in differing locations, to enhance the stability of the vehicle.

The art and science underlying the concept of blowing air described in [0053] already exists and this embodiment of the invention pertains only to the practical application of the concept and specifically as an enhancement of the first and second embodiments of the invention. The same is true of an air supply, control or control system needed for this application.

The art and science to determine the optimum shape of the un-blown or blown rounded corners of the vehicle already exists or can be easily determined through testing. The intent of the invention is to provide an application. Therefore, the possible configurations of the device shown in FIGS. 4, 7, 8 and 9 illustrate only the capability of the invention to be configured in the optimal size and shape and the invention is not limited to or proscribed by the configurations shown.

The first embodiment of the invention applies either, as shown in FIG. 1, to a vehicle 1 without rear doors, and then consists of a set of symmetrically opposite airfoils 4, 7 and 8, designed and located on the aft flat surface 2 of a vehicle, to be close to the four aft edge corners so as to create a contiguous surface with the exterior sides of the vehicle; or, as shown in FIG. 2, to a vehicle 1 having two rear swinging doors 3, and then consists of a set of symmetrically opposite airfoils 4, 5 and 6, designed and located on the aft flat surfaces of the rear doors of the vehicle, to be as close to the four aft edge corners so as to create a contiguous surface with the exterior edges of the doors and the sides of the vehicle; essentially adjacent to the full perimeter of the aft face.

As shown in FIG. 2, due to their attachment to the two aft doors, the top and bottom airfoils 5 and 6 are shorter but generally similar in form and design to the top and bottom airfoils 7 and 8, shown in FIG. 1, and are provided with clearance for the door locking mechanisms 16.

The airfoils 4, 5, 6, 7, and 8 are formed to the desired shape by some conventional means such as press break, roll-form, die form, fabricating or molding and are made of a semi-rigid, resilient material which may be steel, aluminum, plastic, a composite or a full or partial laminate; or some other suitable material; of either uniform or tapered shape.

Figure 10:
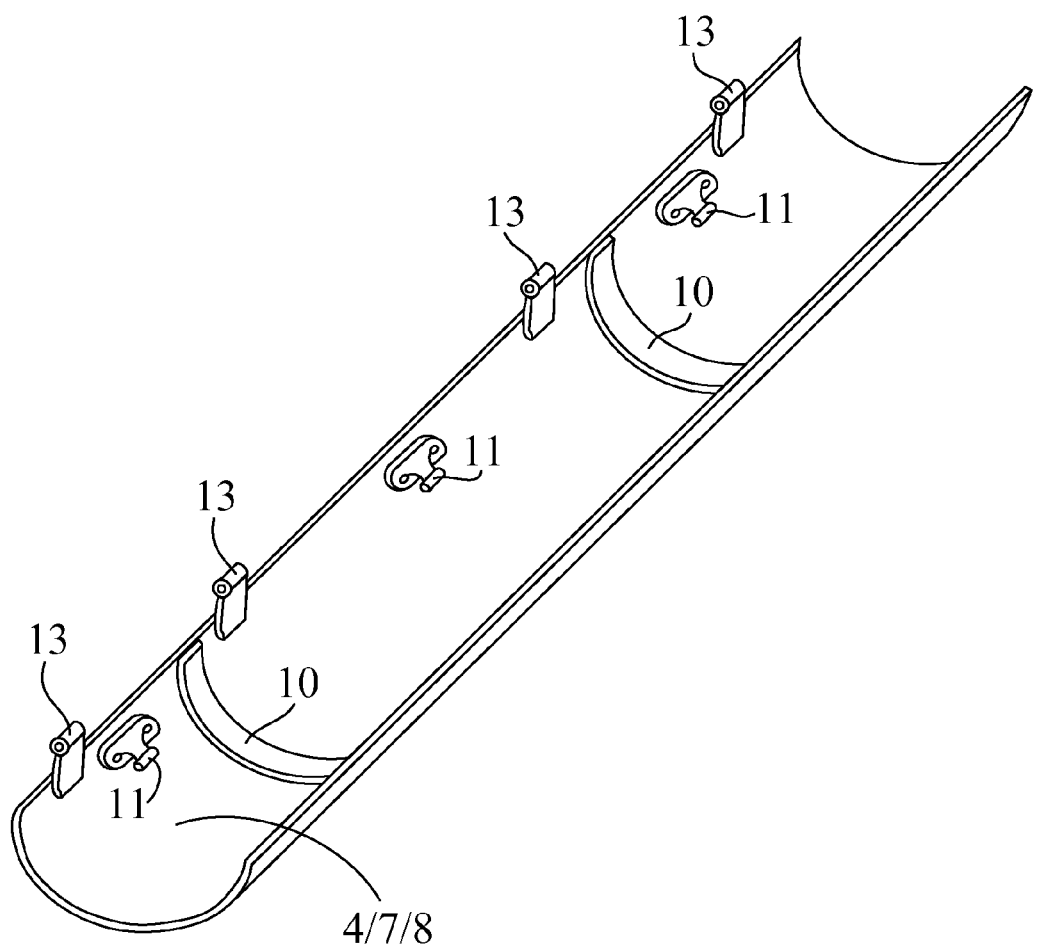
FIG. 10: An isometric view of one element of the devices of the invention in its configuration as a semi-circle, shown out of attached position, illustrating: approximate hinge placement, the addition of one of several inner members which may be used to enhance the rigidity and resilience of the device and the approximate position of the air nozzles of the third embodiment of the invention

Depending on the material used in the manufacture of the airfoils, "helper elements", 10, as shown in FIG. 10, consisting of one, two or more pre-formed, flexible, resilient elements, can be affixed to the inner surfaces of some or all of the airfoils, 4, 5, 6, 7, and 8 to maintain the desired airfoil shape, strength and resiliency.

Figure 5:
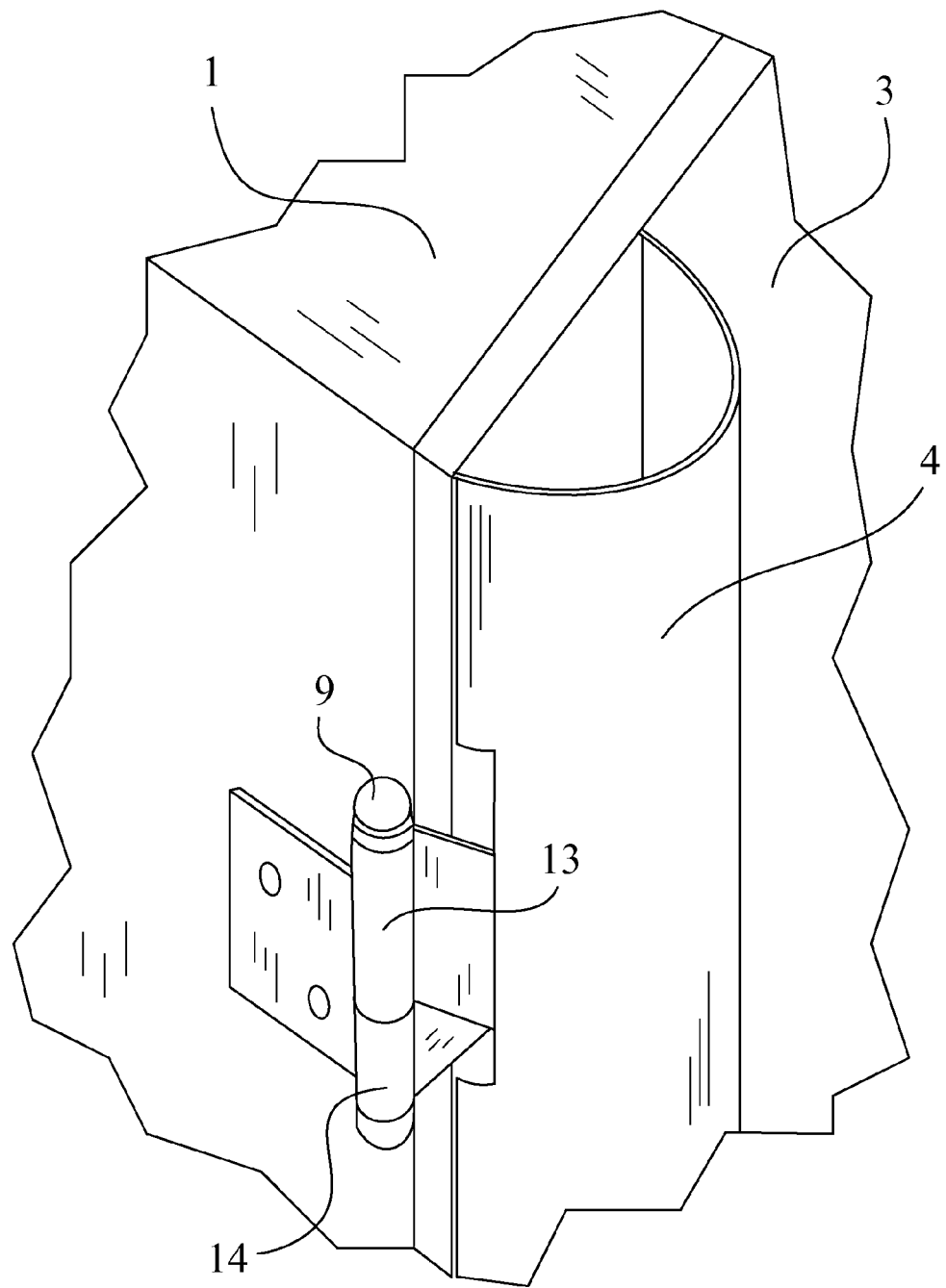
FIG. 5: An isometric detail of the upper left corner of the aft of the vehicle as shown in FIG. 3 illustrating the attachment of the device to one of the existing hinges of the left rear door using a modified hinge pin.

The airfoils, 4, 5, 6, 7 and 8 are attached directly with hinges 13, or in the case of the side airfoils 4, optionally to the existing trailer door hinges 14 by extending the hinge pin 9 to engage one half of the hinge 13 as shown in FIG. 5.

Figure 12:
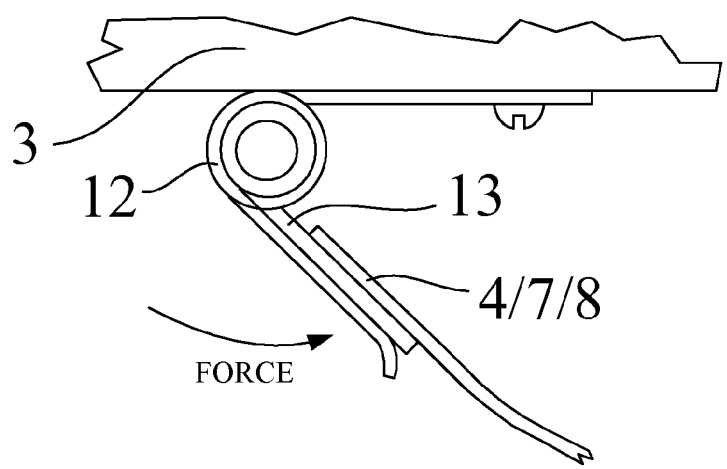
FIG. 12: A sectional view through a left hand attachment hinge showing the placement and function of the torsion spring.

As shown in FIG. 12, some or all of the hinges 13 contain torsion springs 12 to hold the inboard, free edge of the airfoils against the outside faces of the aft surface 2 of the vehicle 1, or the aft faces of the trailer doors 3.

Figure 6:
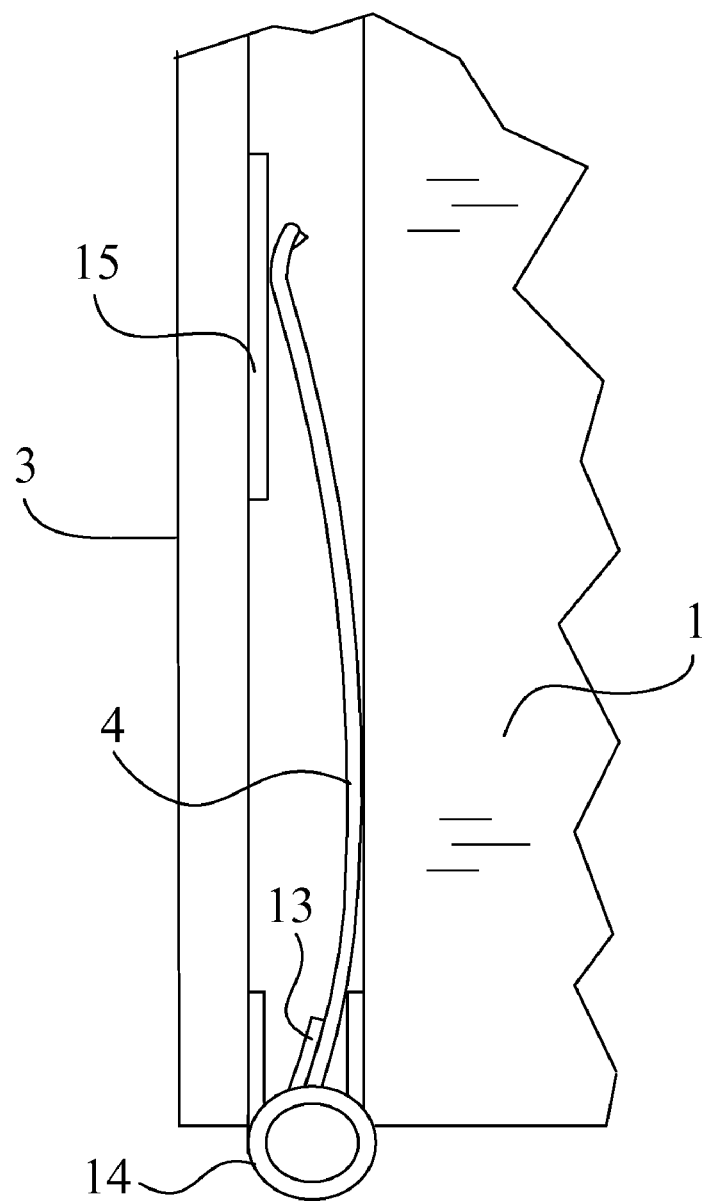
FIG. 6: A bird's eye detail view of the device as shown in FIG. 4, but with the left rear door swung 270 degrees from the closed position and the device shown in the stowed condition.
Figure 7:
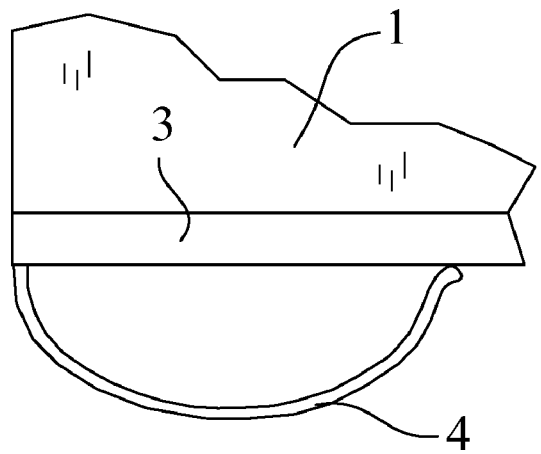
FIG. 7: A bird's eye view of the left side of the aft end of a heavy trailer with the left door closed and the device deployed in its configuration as an elliptical segment having its major axis at a right angle to the fore to aft centerline of the vehicle
Figure 8:
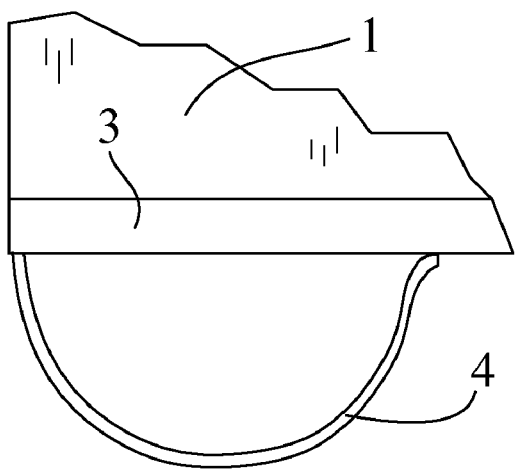
FIG. 8: A bird's eye view of the left side of the aft end of a heavy trailer with the left door closed and the device deployed in its configuration as an elliptical segment having its major axis parallel to the fore to aft centerline of the vehicle
Figure 9:
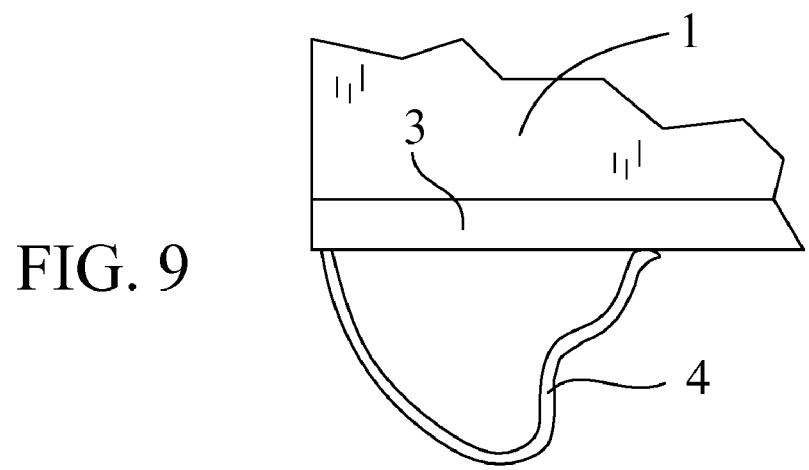
FIG. 9: A bird's eye view of the left side of the aft end of a heavy trailer with the left door closed and the device deployed in a configuration representative of a specially engineered form.

The airfoils 4, 5, and 6, regardless of shape configuration, contain an arc of approximately 180 degrees so that pressure applied at the apex of the arc will flatten the airfoil sufficiently to allow it to lie between the outboard sides of the trailer 1 and the outer faces of the doors 3 when the doors are swung 270 degrees from the closed position into the docking position (the stowed condition), as shown in FIG. 6.

The resilient nature of the airfoil material causes the airfoils to resume their original shape when the applied pressure from door actuation, or from an accidental contact with external objects, has been removed.

To allow the airfoils, 4, 5, 6, 7 and 8 to be more easily flattened, two or more strips of a material 15, having a low coefficient of friction, can be applied to the outer faces of the doors 3, relative to the inboard edge of each airfoil as shown in FIG. 6.

When the side airfoils 4 are used in conjunction with the top and/or bottom airfoils 5 and 6, the side airfoils 4, being closer to the sides of the trailer 1, flatten out before the top or bottom airfoils 5 and 6 as the trailer doors 3 are opened and swung 270 degrees. This allows the side airfoils to slide under the top and/or bottom airfoils in the stowed condition.

The second embodiment of the invention (one application of which is shown in FIG. 3, side airfoils 4 used alone) consists of the selective attachment of airfoils to less than all four, edge corners of the vehicle, so that the top, bottom and side airfoils may be employed independently or in various combinations.

The third embodiment of the invention, shown in FIGS. 10 and 11, consists of the addition of a plurality of air nozzles 11 to any or all of the airfoils 4, 5, 6, 7 and 8, designed to direct blown air tangentially along the outer surface of the airfoils. The nozzles are positioned in slots cut or formed in the faces of the airfoils, as close as possible to the attachment edge.

The nozzles 11 are made of a weather resistant material such as plastic, stainless steel or anodized aluminum, designed to be cast, fabricated or molded in a compact shape so as to not interfere with airfoil stowing and to be economically manufactured. The nozzle design incorporates a "tee" or "ell" shaped fitting for attachment of air supply tubing.

The design of all embodiments of the invention is such that installation, adaptation and replacement can be quickly accomplished in the field using hand tools, or can be a part of the original vehicle manufacturing process with little added labor. It is intended that, to suit the placement of the hinges 14 and/or door locks 16 of the most common trailer models, the attaching hinges 13 can be pre-installed. Alternately, their placement and number can be determined and easily hand applied in the field to suit, along with any necessary clearances.

The invention claimed is:

1. An apparatus for reducing drag at the trailing end of a vehicle having an outer, aft surface comprised of two swinging doors, said apparatus comprising:

two or more curved airfoils having opposing inboard and outboard edges and encompassing an arc of approximately 180 degrees, said two or more airfoils being attached to the swinging doors at an outboard edge of each airfoil by a plurality of hinges and torsion springs, the torsion springs bias said two or more airfoils against said doors so that the opposing inboard, unattached edges of said two or more airfoils are in contact with said doors, whereby said two or more airfoils have enough intrinsic strength to resist deformation by ambient air flow while having sufficient flexibility and resiliency to deflect and then return to thief initial shape if impacted with a minimal force and each of the at least two airfoils is compressed nearly flat between the doors and outer surfaces of opposing longitudinal sidewalls of the vehicle when the doors are swung through approximately 270 degrees from a closed position, then return to their initial shape when the doors are once again closed.

2. The apparatus according to claim 1, wherein the at least two airfoils consist of two airfoils attached to outboard vertical edges of the doors.

3. The apparatus according to claim 1, wherein the at least two airfoils consist of two airfoils attached to outboard upper horizontal edges of the doors.

4. The apparatus according to claim 1, wherein the at least two airfoils consist of four airfoils with two of said four airfoils being attached to outboard vertical edges of the doors and the other two of said four airfoils being attached to outboard upper horizontal edges of the doors.

5. The apparatus according to claim 1, wherein the at least two airfoils consist of four airfoils with two of said four airfoils being attached to outboard upper horizontal edges of the doors and the other two of said four airfoils being attached to outboard lower horizontal edges of the doors.

6. The apparatus according to any one of claim 1 to 5, wherein any or all of said airfoils contain a plurality of slots fitted with air nozzles designed to direct blown air tangentially along the outer surface thereof.

* * * * *